(12) United States Patent
Munir et al.

(10) Patent No.: US 9,108,748 B2
(45) Date of Patent: Aug. 18, 2015

(54) SATELLITE ORBIT RAISING USING ELECTRIC PROPULSION

(75) Inventors: Saghir Munir, Union City, CA (US); Darren Stratemeier, Mountain View, CA (US); Xen Price, Redwood City, CA (US); Yassir Azziz, San Mateo, CA (US); Jorge Delgado, San Jose, CA (US); Justo Jacinto, Palo Alto, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 761 days.

(21) Appl. No.: 12/925,386

(22) Filed: Oct. 20, 2010

(65) Prior Publication Data

US 2012/0097796 A1    Apr. 26, 2012

(51) Int. Cl.
    B64G 1/24    (2006.01)
    B64G 1/00    (2006.01)
    B64G 1/40    (2006.01)
    B64G 1/36    (2006.01)

(52) U.S. Cl.
    CPC ...... *B64G 1/007* (2013.01); *B64G 1/24* (2013.01); *B64G 1/405* (2013.01); *B64G 1/36* (2013.01); *B64G 1/361* (2013.01)

(58) Field of Classification Search
    USPC ............ 244/158.4–158.6, 158.8, 164; 701/13
    See application file for complete search history.

(56) References Cited

U.S. PATENT DOCUMENTS

| 4,010,921 | A |   | 3/1977  | Pistiner et al. |
|-----------|---|---|---------|-----------------|
| 5,349,532 | A | * | 9/1994  | Tilley et al. ............... 701/13 |
| 5,595,360 | A | * | 1/1997  | Spitzer ................. 244/158.5 |
| 5,984,236 | A | * | 11/1999 | Keitel et al. ............. 244/164 |
| 6,116,543 | A |   | 9/2000  | Koppel |

(Continued)

OTHER PUBLICATIONS

Chen, X. and Steyn, W., Optimal combined reaction-wheel momentum management for LEO Earth-pointing satellites, 12th AIAA/USU Conference on Small Satellites, SSC98-IX-2, 1998.

(Continued)

*Primary Examiner* — Justin Benedik
(74) *Attorney, Agent, or Firm* — Weaver Austin Villeneuve & Sampson LLP (57) ABSTRACT

Apparatus and methods for raising the orbit of a satellite having electric propulsion thrusters, an Earth sensor and an inertial reference sensor such as a gyro. A satellite positioning system generates orbital data and a profile generator generates an ideal electric orbit raising profile of the satellite. The ideal profile is one that the satellite must follow so that the perigee, apogee and inclination of the satellite can be adjusted simultaneously in a mass-efficient manner. A state machine processes the ideal profile and a true anomaly to generate a desired electric orbit raising profile. Steering apparatus generates signals that are used to control the attitude of the satellite to follow the desired profile. The desired profile places the satellite in an Earth-pointed attitude when the satellite is at a predefined point in the orbit, slews the satellite from the Earth-pointed attitude to an ideal orbit raising attitude, steers the satellite according to the ideal profile during orbit raising, and steers the satellite from the desired attitude to the Earth-pointed attitude.

24 Claims, 8 Drawing Sheets

(56) References Cited

U.S. PATENT DOCUMENTS

| | | | |
|---|---|---|---|
| 6,253,125 B1 * | 6/2001 | Barker | 701/13 |
| 6,293,501 B1 * | 9/2001 | Kurland | 244/164 |
| 6,305,646 B1 * | 10/2001 | McAllister et al. | 244/158.8 |
| 6,543,723 B1 * | 4/2003 | Oh | 244/158.5 |
| 6,637,701 B1 * | 10/2003 | Glogowski et al. | 244/169 |
| 6,695,263 B1 * | 2/2004 | Goodzeit | 244/164 |
| 7,113,851 B1 | 9/2006 | Gelon et al. | |
| 2010/0179711 A1 * | 7/2010 | Munir et al. | 701/13 |
| 2012/0097796 A1 * | 4/2012 | Munir et al. | 244/158.6 |
| 2012/0097797 A1 * | 4/2012 | Woo et al. | 244/158.6 |

OTHER PUBLICATIONS

Brophy, John R. and Noca, Muriel, "Electric Propulsion for Solar System Exploration", Journal of Propulsion and Power vol. 14, No. 5, Sep.-Oct. 1998.

Kimbrel, Michael Scott, Jun. 2002, "Optimization of Electric Propulsion Orbit Raising", Massachusetts Institute of Technology, 102 pages.

* cited by examiner

Nominal EOR requires both SPTs to be fired simultaneously

SPT fired such that the thrust vector is aimed toward anti-Earth deck

Modulating both DAPMs* will provide three axes momentum dumping (no bi-prop required)

Fig. 5b

EOR can also be performed with a single SPT

SPT fired such that the thrust vector is aimed through the C.M.

SPT DAPM assembly modulated to dump roll/yaw momentum

Fig. 6

SATELLITE ORBIT RAISING USING ELECTRIC PROPULSION

BACKGROUND

The present invention relates generally to satellites and satellite orbit raising methods, and more particularly, to apparatus and methods for raising the orbit of a satellite using electric propulsion.

Prior art orbit raising techniques are generally known to those skilled in the satellite art. For example, exemplary orbit raising techniques are described in U.S. Pat. No. 5,595,360 issued to Spitzer, entitled "Optimal Transfer Orbit Trajectory Using Electric Propulsion," U.S. Pat. No. 6,116,543, issued to Koppel, entitled "Method and a System for Putting a Space Vehicle into Orbit, Using Thrusters of High Specific Impulse," U.S. Pat. No. 6,543,723, issued to Oh, entitled "Electric Orbit Raising with Variable Thrust," and U.S. Pat. No. 7,113,851, issues to Gelon et al., entitled "Practical Orbit Raising System and Method for Geosynchronous Satellites."

The technique described in U.S. Pat. No. 5,595,360 attempts to first adjust the semi-major axis such that the orbit has a period equal to one sidereal day. This implies that the satellite's mean longitude does not change. Thereafter the eccentricity and inclination are adjusted until the desired GEO orbit is reached. This technique is suboptimal from a mass perspective, when compared to the invention disclosed herein. Furthermore, no strategy has been given as to how this method can be automated. Can this method be done effectively without a star tracker? What is the level of operator burden? The disclosed invention addresses these issues.

The technique described in U.S. Pat. No. 6,116,543 attempts to reach the desired orbit in at least a two stage process, when using electric propulsion. In the first stage, the apogee and perigee are adjusted by firing the thruster in a spiral trajectory, while minimizing the inclination. Thereafter in stage two, the apogee and perigee are adjusted independent of each other in a constant predetermined direction while also minimizing the inclination. This two step process is suboptimal when compared to the invention described herein. This technique also has operational challenges, with respect to spacecraft steering profile, power, telemetry monitoring, tracking, and commanding (TT&C) outages and autonomy, and may be of limited practical value.

The technique described in U.S. Pat. No. 6,543,723 requires variable thrust from Hall effect thrusters (SPTs). This patent addresses throttling the SPTs to operate at an optimum specific impulse levels. This patent details computing the optimum specific impulse for launching the satellite into orbit using chemical and electric propulsion devices. This patent addresses a slightly different aspect of Earth orbit raising (EOR) than does the invention described herein.

The technique described in U.S. Pat. No. 7,113,851 outlines a hybrid chemical and electric orbit raising method, and does not focus on the practicalities associated with carrying out such a task. It does not address how the electric orbit raising portion of the mission may be implemented with relative operational ease, nor does it address how such a scheme may be implemented without full 3-axis sensing, such as in the absence of a star tracker. It also does not address how momentum may be managed, without excessive use of chemical thrusters, when electric orbit raising is performed with only a single thruster. Furthermore no details pertaining to autonomy, such as those required during telemetry and command outages are provided. The invention disclosed herein addresses these practical details which are essential for a robust mission and its implementation.

It would be desirable to have apparatus and methods for raising the orbit of a satellite using electric propulsion that overcomes issues with previous techniques.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which.

DETAILED DESCRIPTION

Figure 1:
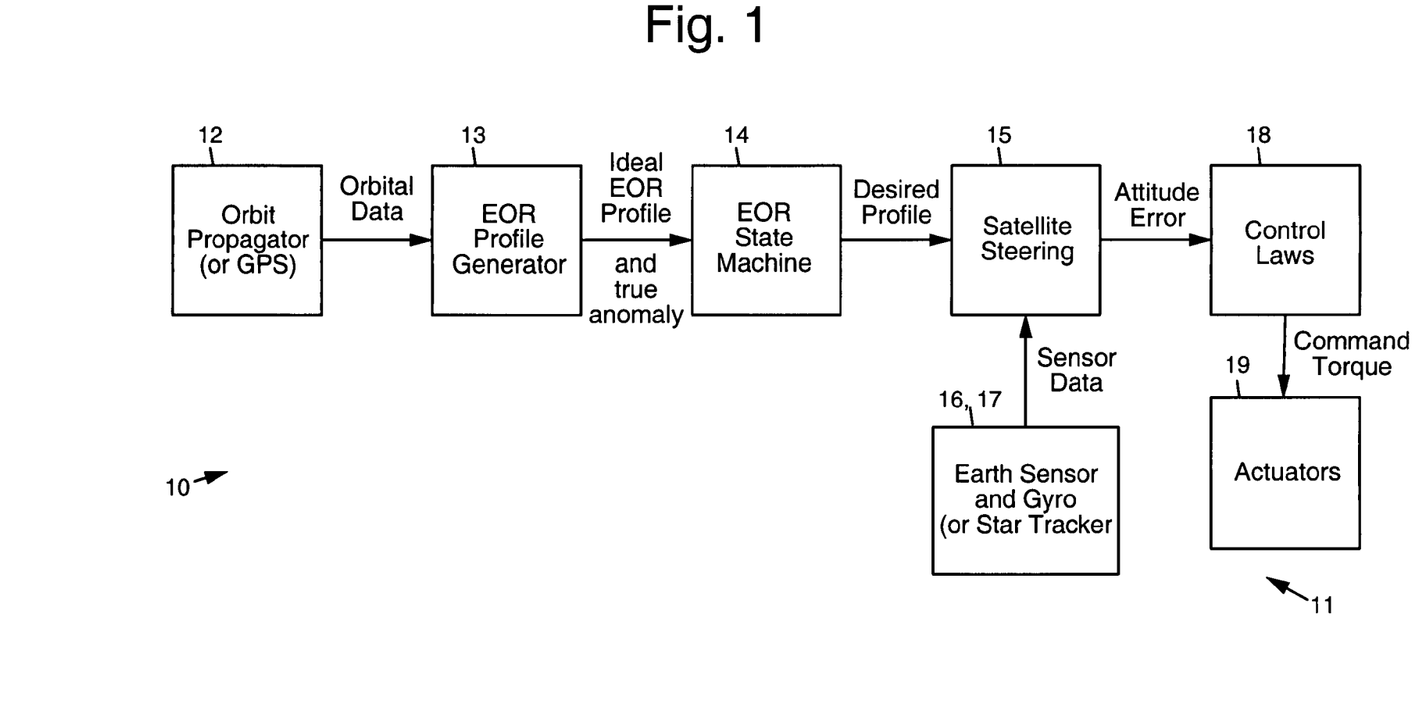
FIG. 1 illustrates an exemplary architecture of apparatus that provides for electric propulsion satellite orbit raising.
Figure 2:
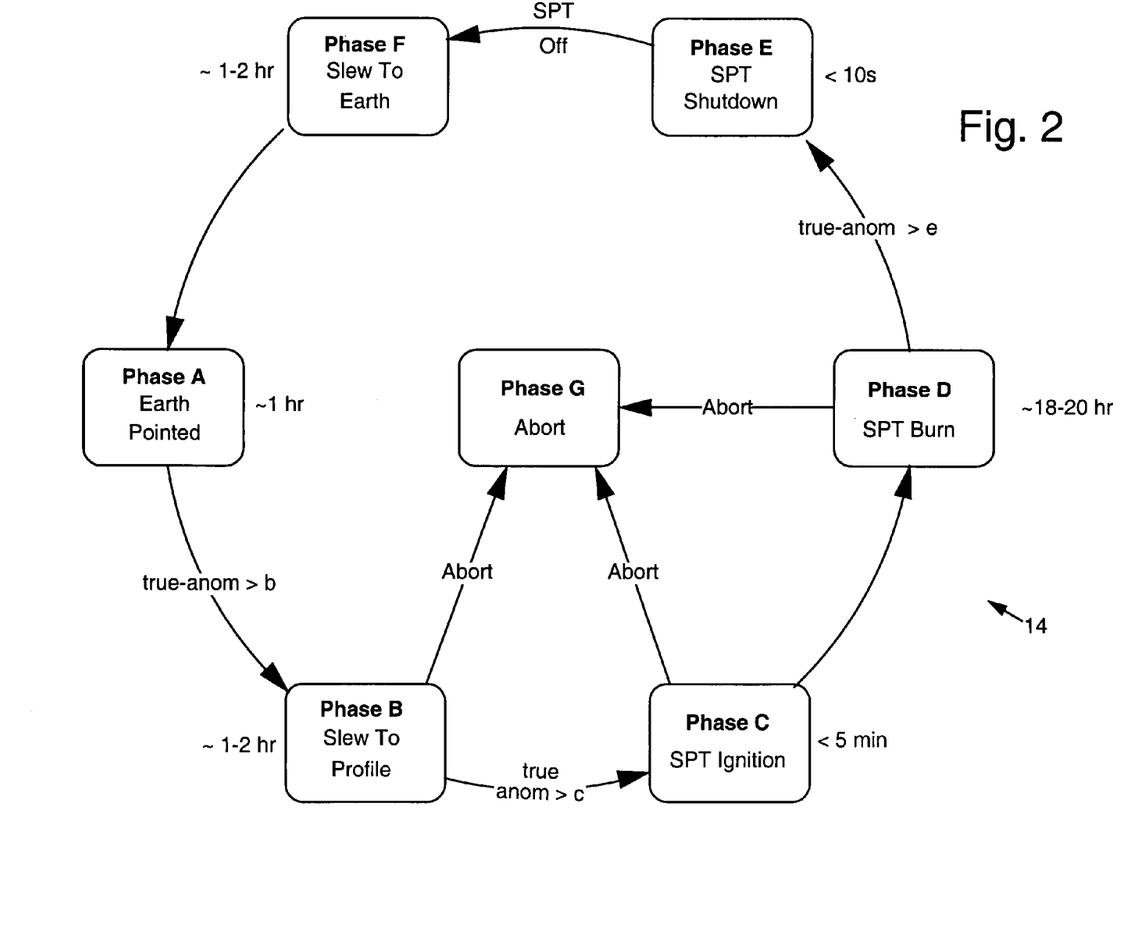
FIG. 2 illustrates details of an exemplary electric propulsion satellite orbit raising state machine.

Referring to the drawing figures, disclosed are apparatus 10 (FIG. 1) and methods 40 (FIG. 4) for raising the orbit of a satellite using electric propulsion, employing a state machine, and at a minimum an Earth sensor and a gyro. More specifically, FIG. 1 illustrates an exemplary architecture of apparatus 10 that provides the attitude profile that the satellite must follow during electric propulsion orbit raising. FIG. 2 illustrates details of an exemplary electric propulsion satellite orbit raising state machine 14 that may be employed in the apparatus 10 shown in FIG. 1. FIG. 3 illustrates an exemplary timeline that implements electric propulsion satellite orbit raising.

A satellite 11 is configured to have one or more electric propulsion thrusters, such as Hall effect thrusters (SPT) and bi-propulsion thrusters (if desired). The satellite 11 is configured to have a positioning system 12, such as an orbit propagator 12 or global positing system 12. The positioning system 12 is coupled to an electric orbit raising (EOR) profile generator 13. The EOR profile generator 13 is coupled to an EOR state machine 14. Outputs of the EOR state machine 14, along with data outputs from an Earth sensor 16 and a gyro 17 are coupled to satellite steering apparatus 15. The satellite steering apparatus 15 outputs error signals that are input to control laws 18 that control the attitude of the satellite 11 via actuators 19, such as a wheel system, for example.

In operation, and also referring to FIGS. 2 and 3, the on-board positioning system 12, such as the orbit propagator 12 or GPS 12, is used to compute the position of the satellite 11 in a dynamically changing orbit, accounting for firings of the Hall effect thrusters (SPT) and (if any) bi-propulsion thrusters. The positioning system 12 generates instantaneous orbital data that are fed into the EOR profile generator 13. The EOR profile generator 13 computes an ideal EOR attitude (profile) that the satellite 11 must follow so that the perigee, apogee and inclination of the satellite 11 can be adjusted simultaneously in a mass-efficient manner. This ideal profile is fed into the EOR state machine 14 which generates (computes) a desired profile to steer the satellite 11 according to the ideal profile during orbit raising (i.e., when in phase D). Otherwise the profile generated by the EOR state machine 14 keeps the satellite 11 Earth-pointed (i.e., when in phase A). In between, the profile generated by the state machine 14 either slews the satellite 11 from Earth-pointed configuration to the EOR desired attitude (i.e., phase B), or from an EOR-desired attitude to an Earth-pointed configuration (i.e., phase F). During phases C and E, the SPTs are started and shut down by the state machine 14. All configuration of the on-board fault detection, isolation and recovery are also carried out by the state machine 14 at the appropriate true-anomalies provided by the onboard positioning system 12 (orbit propagator 12 or global positing system 12). The true anomaly is the angle measured in the direction of motion from perigee to the position of the satellite 11 at some defined epoch time. The EOR state machine 14 also includes phase G which aborts any of phases B, C or D, which may be required to shut down the SPTs and return the satellite 11 to an Earth pointed orientation in the event of an anomaly. The Earth pointed orientation is generally trusted to be a safe attitude, as it guarantees telemetry and commanding when there is line of site coverage to a ground station.

The EOR profile generator 13 and the state machine 14 are parameterized by the instantaneous orbital elements (i.e., the orbital data from the positioning system 12). Therefore, given the on-board knowledge of the orbit, the desired time varying optimal steering attitude profile required for EOR, and the time at which state machine 14 transitions between major phases adjusts automatically. By the very nature of automatic Earth reacquisitions, to upright the satellite 11 and reset the gyro 16 based on the calculated position of the Earth relative to the satellite 11, satellite orbital knowledge and Earth sensor data (which indirectly localizes the satellite 11 with the correct Earth geometry), the effects of gyro drift are removed at the beginning of every revolution. All a user has to do is monitor each revolution of the satellite 11.

If the satellite 11 includes a star tracker, Earth acquisition would not be required, but the state machine 14 can still drive the entire EOR process and continue to provide the operational ease and autonomy for which it was designed. If there is an onboard GPS 12, then the orbit propagator 12 is also not required, as the GPS 12 can provide the desired information.

The apparatus 10 and methods 40 simultaneously drive the satellite perigee, apogee and inclination toward target values, with the entire process automated by the state machine 14 driven by the onboard positioning system 12 (orbit propagator 12 or GPS 12). The EOR process is simplified from an operations point of view, as a result of the using the state machine 14. The state machine 14, like the optimal steering profiles, is parameterized by the onboard orbital data derived from the positioning system 12. The positioning system 12 (orbit propagator 12 or GPS) accounts for the changing orbit due to the firing of the SPTs with the satellite 11 in the optimal steering attitude. Thus, the optimal steering profile and state machine 14 are autonomously adjusted in terms of timing due to a dynamically changing orbit. All a ground station operator has to do is monitor the satellite 11.

Note that the prior art solutions described in U.S. Pat. Nos. 5,595,360 and 6,116,543 are sub-optimal from a mass perspective. The techniques described herein would also be relatively hard to implement without the use of the state machine 14. This may be the reason the inventors of U.S. Pat. Nos. 5,595,360 and 6,116,543 implemented suboptimal solutions. Not only the assignee of the present invention been able to implement a more efficient solution as described herein, but this can be done without a star tracker, even though the satellite 11 is steered at large angles in inertial space using the gyro 17 for extended periods of time.

Figure 3A:
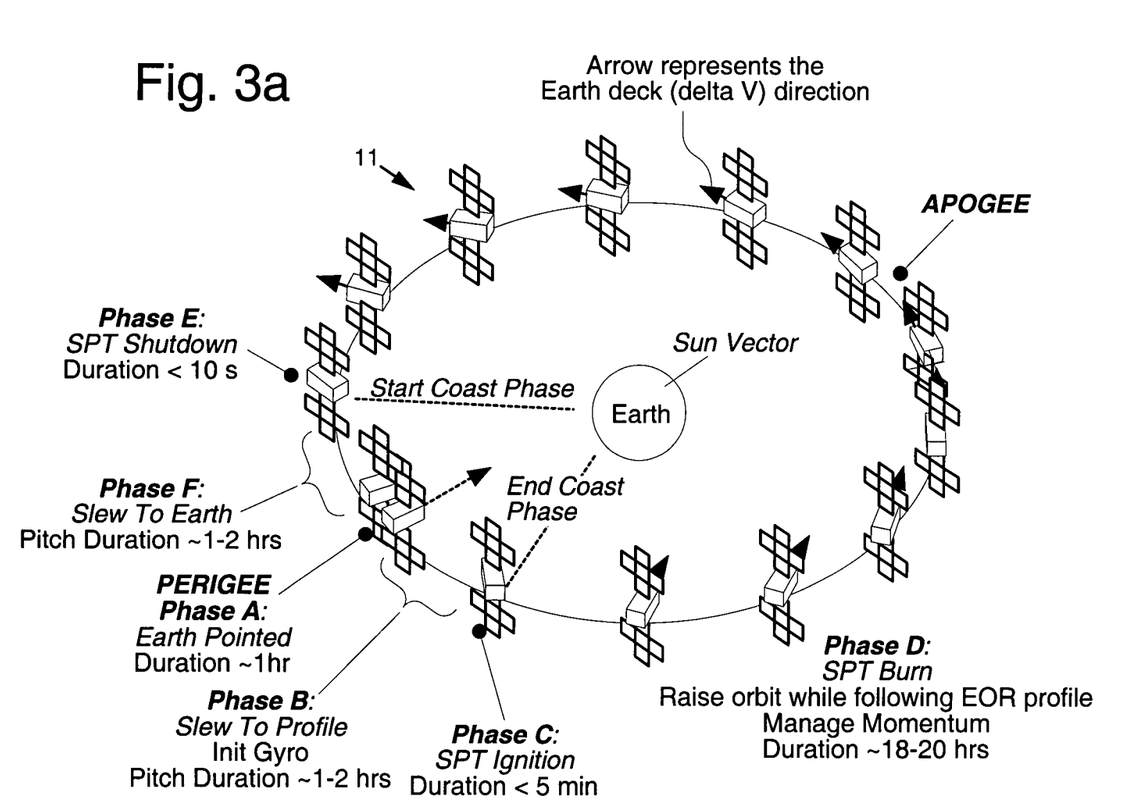
FIG. 3a illustrates an exemplary electric propulsion satellite orbit raising timeline for two SPT electric orbit raising
Figure 5A:
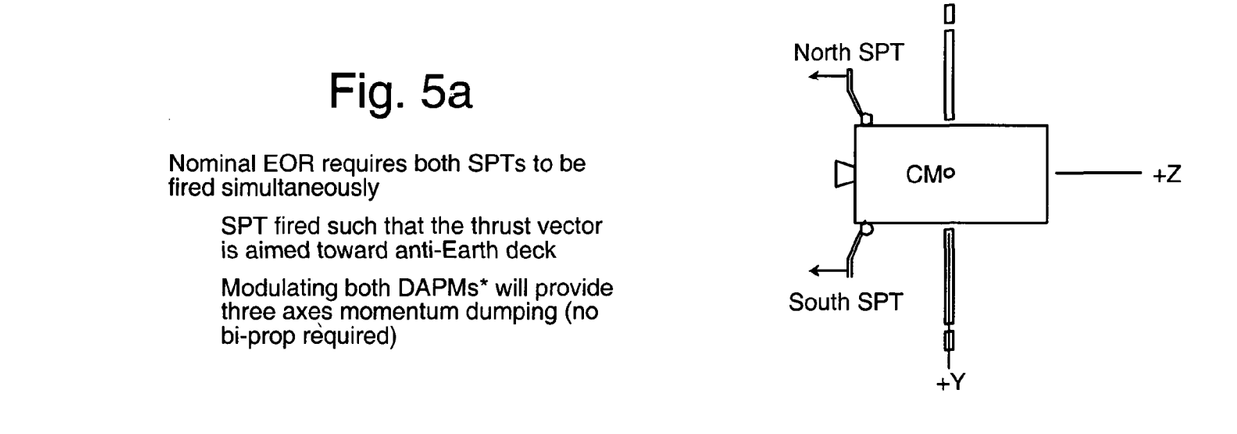
FIG. 5a illustrates an exemplary orientation of the dual axes positioning mechanisms (DAPMs) for two SPT electric orbit raising.

The following presents details of the EOR process implemented by the apparatus 10 and methods 40. FIG. 2 illustrates details of an exemplary state machine 14. FIG. 3a illustrates an exemplary timeline for achieving electric propulsion satellite orbit raising. In this case, both SPTs are fired aimed in the anti-Earth deck direction as indicated in FIG. 5a.

The EOR process begins with the satellite 11 in an Earth pointed configuration, using the Earth sensor 16 (Phase A). At this time, the satellite 11 is steered in yaw, such that the roll rate reported by the gyro 16 is zero. Assuming that the gyro 16 is well-calibrated, the x-axis of the satellite 11 is in the orbital plane, with the z-axis of the satellite 11 locked onto the Earth. This phase of the EOR state machine 14 is shown in FIGS. 2 and 3, and is identified as phase A, and is referred to as the Earth pointed phase.

Once the desired true anomaly is reached, the state machine 14 transitions to phase B where the gyro 15 is initialized with respect to an inertial reference frame, assuming that the satellite 11 is Earth-pointed (satellite z-axis is Earth-pointed), and the satellite x-axis is in the orbital plane close to the velocity vector. From the satellite's orbit, Earth sensor data, and the Earth's calculated position, the attitude of the satellite 11 in inertial space can be exactly localized. Thus, an attitude quaternion to which the gyro 17 must be initialized can be computed. Immediately after initialization of the gyro 17, the satellite 11 executes a large slew using only the gyro 17 for inertial reference and reaction wheels to align the thrust vector of the satellite 11 with the desired EOR profile.

Once on the profile, the EOR state machine 14 is transitioned to phase C where the SPTs are ignited, and the EOR state machine 14 then transitions to phase, D. For the next 18-20 hours, while in phase D, the satellite 11 is steered according to the EOR profile while in reaction-wheel-based gyro mode. During this time the momentum is managed by offsetting the combined thrust vector from the center of mass of the satellite 11.

Once the desired true-anomaly is reached, the SPTs are turned off in phase E, and then the satellite 11 is slewed back toward the Earth using the reaction-wheel-based gyro mode, with knowledge of the Earth provided by the positioning system 12 (orbit propagator 12 or GPS 12). Once the Earth is acquired, there is likely to be a small offset reported in the Earth measurement (from the Earth sensor 16), due to gyro drift and errors in the time and onboard orbital data. However a majority of this error (>95%) should be due to gyro drift alone. Once control switches to the Earth sensor 16, and the satellite 11 locks onto the Earth, the error due to the gyro 17 is removed upon next reinitialization of the onboard gyro-propagated attitude estimate in phase A. The cycle is then repeated.

It should be evident that if a user re-initializes the orbit before the onboard orbital error exceeds some predetermined amount, the entire process remains well automated. Alternatively having an onboard GPS 12 can do the same thing.

Figure 3B:
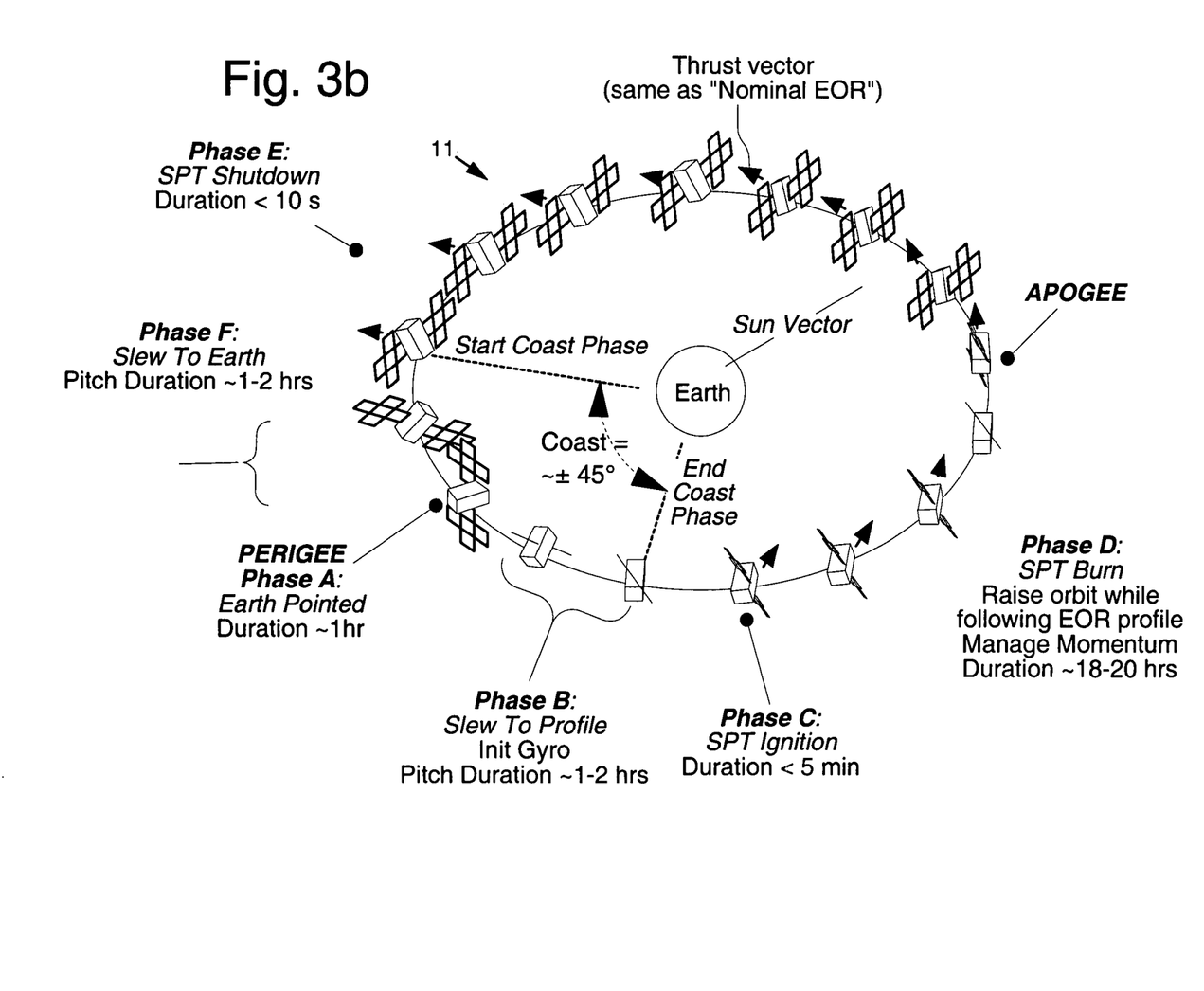
FIG. 3b illustrates an exemplary electric propulsion satellite orbit raising timeline for a single SPT electric orbit raising
Figure 5B:
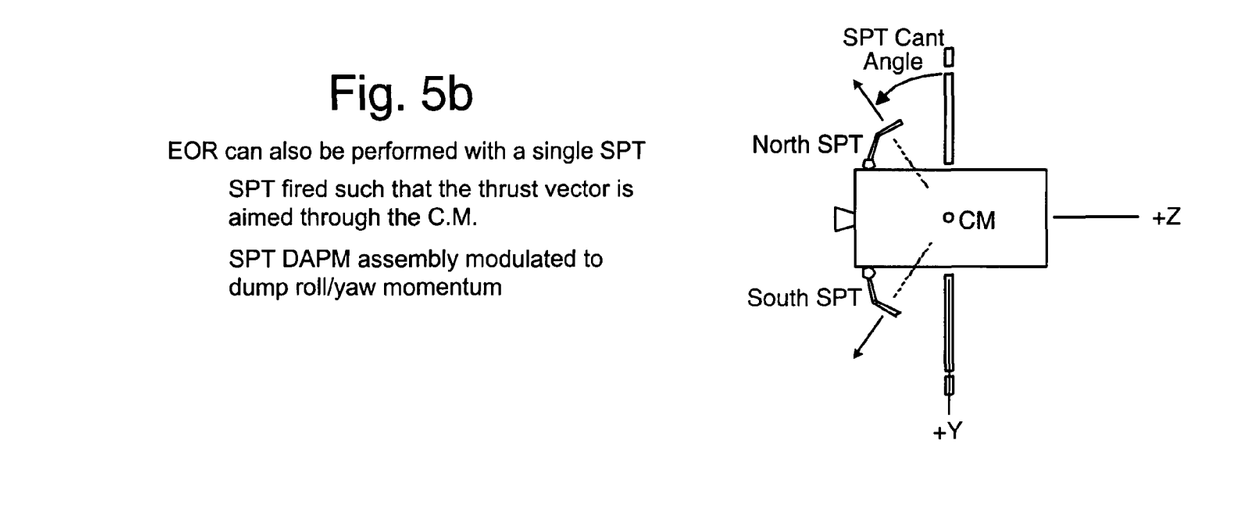
FIG. 5b illustrates an exemplary orientation of the dual axes positioning mechanism (DAPMs) for single SPT electric orbit raising.

In an alternative embodiment, EOR may be performed with one SPT. In this case the thruster is fired aimed through the center of mass of the satellite 11 but aligned with the ideal EOR thrust profile, as shown in FIG. 5b. The satellite 11 executes a longer slew in order to aim the SPT thrust vector such that the change in velocity (delta-V) is imparted in the desired direction as dictated by the EOR profile. The length of the slew is elongated by the extra 'roll' attitude change, which also effects power. FIG. 3b illustrates an exemplary timeline for achieving electric propulsion satellite orbit raising with a single SPT fired through the satellite center of mass, but kept on the same EOR profile as that shown in FIG. 3a.

Figure 4:
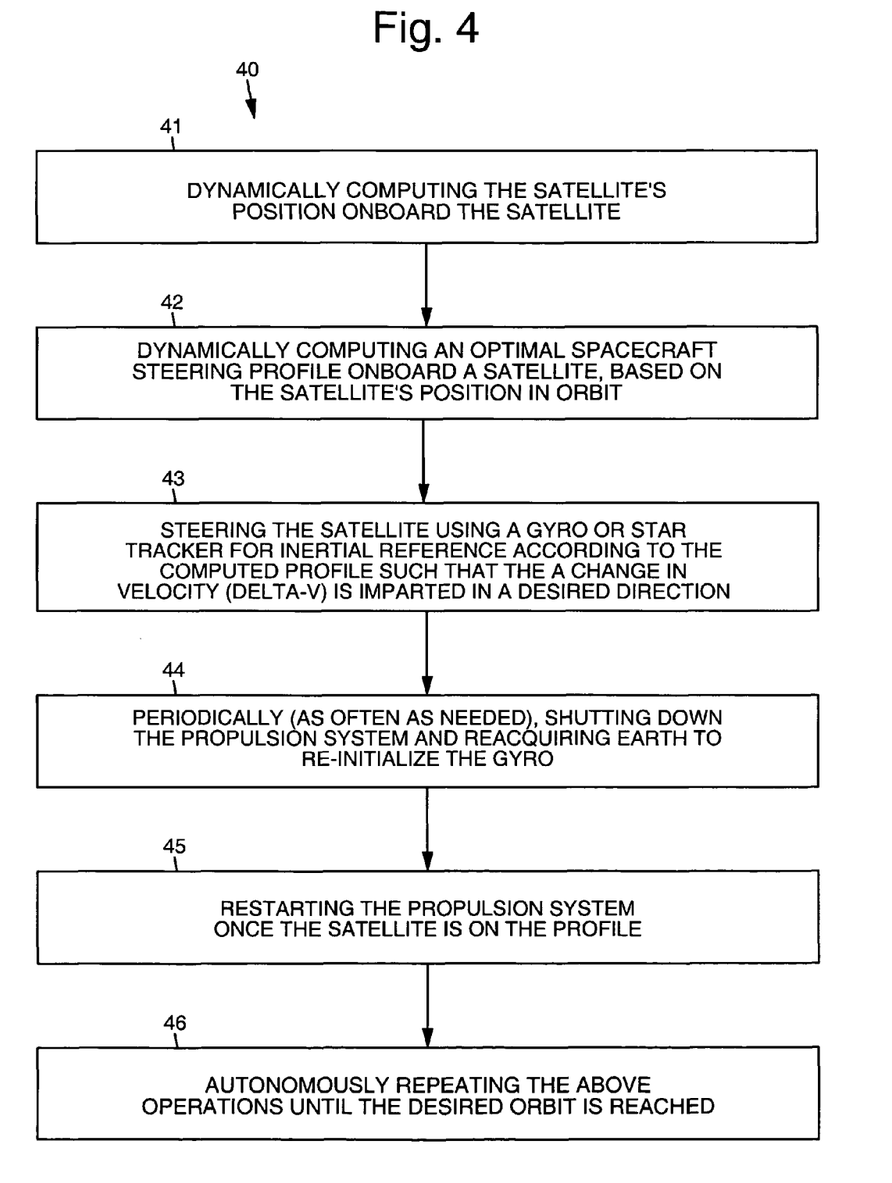
FIG. 4 illustrates an exemplary electric propulsion satellite orbit raising method.

With the above in mind, FIG. 4 illustrates an exemplary electric propulsion satellite orbit raising method 40. The exemplary method 40 dynamically computes 41 the position of the satellite 11 onboard the satellite 11. An optimal satellite steering profile is also dynamically computed 42 onboard the satellite 11, based on the satellite's position in orbit. This optimal profile provides more mass benefit than prior art solutions because it simultaneously drives the satellite perigee, apogee and inclination toward target values.

The satellite 11 is steered 42, using the gyro 17 (or star tracker) for inertial reference, according to the computed profile such that a change in velocity (delta-V) of the satellite 11 is imparted in a desired direction.

Periodically (as often as needed), the propulsion system is shut down and the Earth is reacquired 43 via direct slew in conjunction with an onboard orbit propagator, for example, to re-initialize 44 the gyro and perform other satellite maintenance, if desired, and then the propulsion system is restarted 45 once on the profile again. This removes the effect of accumulated gyro drift. The reacquisition in order to reset the gyro, maybe needed as often as every revolution or as infrequently as every few days. In the case of a star tracker, periodic Earth re-acquisition 43 is not required.

Steps 41 through 45 are autonomously repeated 46 until the desired orbit is reached. No daily planning to compute the EOR attitude profile is required, as the profile is computed onboard the satellite 11 using orbital data from the onboard positioning system 12 (orbit propagator 12 or global positing system 12).

The method 40 described herein, which may last on the order of several months, automates the entire EOR process, using the state machine 14 which issues commands parameterized by the true-anomaly of the dynamically changing orbit. Since the expressions for the optimal profiles are also parameterized by the orbital data, the use of the on-board positioning system 12 (orbit propagator 12 or global positing system 12) that accounts for the imparted change in velocity (delta-V) is made. This ensures that the on-board dynamic positioning system 12 (orbit propagator 12 or global positing system 12) is properly initialized, automates the entire process, including autonomously reacquiring the Earth to reset the gyro 17 in order to remove the accumulated drift. This also eliminates the requirement for star trackers, which amounts for increased cost and mass.

Furthermore, using a state machine 14 reduces the chances of operator error and allows the satellite 11 to fly through telemetry and command outages, and streamlines the entire process. The automation provided by the state machine 14 requires that the satellite 11 only have brief coverage to just a single ground station for periodic maintenance, thus reducing orbit raising costs compared with prior art solutions.

The illustrative drawings showing the EOR timeline (FIG. 3a and FIG. 3b) depict exemplary profiles, where the satellite thruster vector is primarily steered in the orbital plane. However it is important to mention that the present invention also applies when the satellite 11 is steered out of plane, in the case of inclination removal or adjustment.

When EOR is performed with two SPTs mounted on separate dual axes positioning mechanisms (DAPMs) as depicted in FIG. 5a, full 3-axis momentum dumping is possible. For the illustration depicted in FIG. 5a, roll and pitch momentum may be dumped by actuating the north and south DAPMs together in the same direction, while yaw momentum may be dumped by actuating the north and south DAPMs in equal opposite directions. Thus the use of chemical thrusters for momentum dumping with SPTs mounted on two DAPMs is not required.

When EOR is performed with only one SPT, or with more than one SPT mounted on the same DAPM as shown in FIG. 5b momentum can only be dumped in two of the three axes. This is because offsetting the net thrust vector from the center of mass produces torque orthogonal to the thruster vector. What is not possible is the ability to generate torque parallel to the thrust vector, hence the direction in which momentum cannot be dumped is the same as the thrust vector itself. From this, one can incorrectly assume that excessive use of chemical thrusters may be required to manage momentum in the direction of the thrust vector. However, this is not the case, because the thrust vector (i.e. unmanageable axis) revolves in inertial space.

Figure 6:
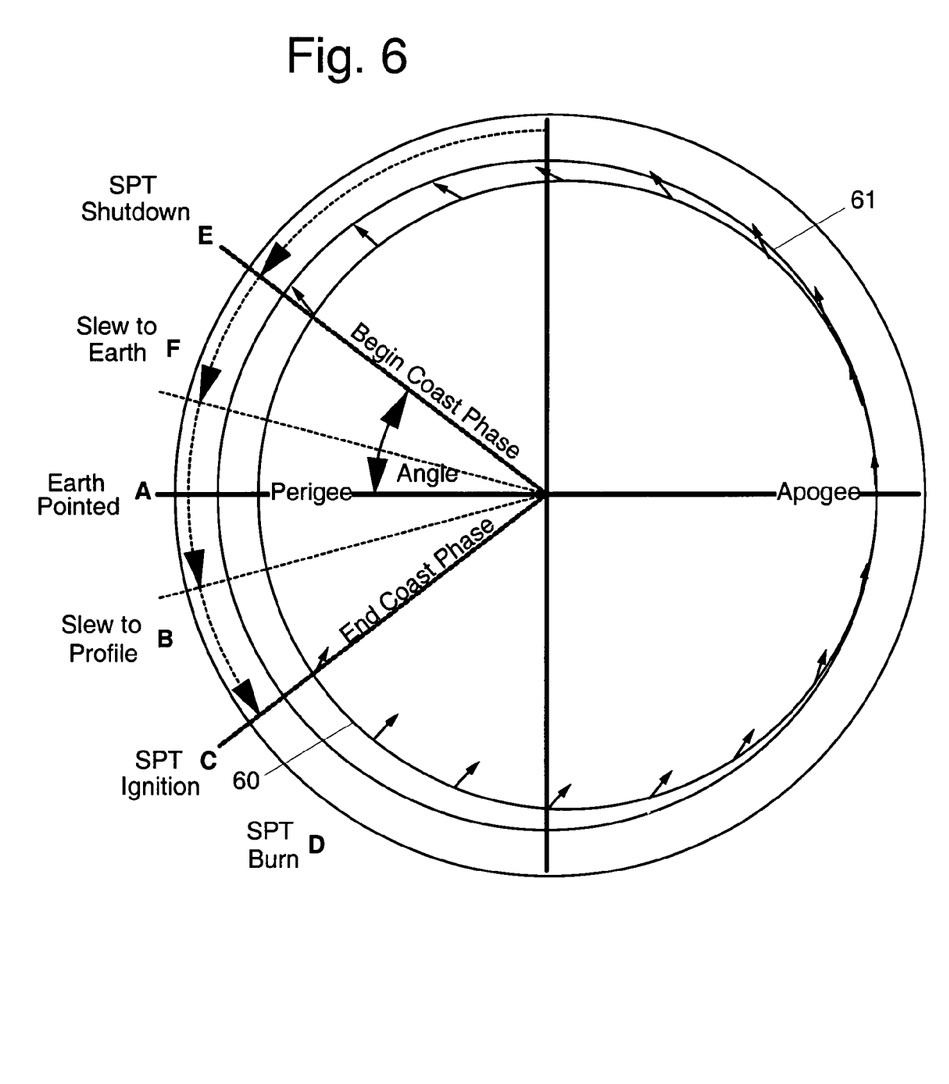
FIG. 6 illustrates an exemplary orientation of the ideal electric orbit raising thrust vector profile in inertial space.

FIG. 6 shows an illustration of the thrust vector when viewed from an angle orthogonal to the orbital plane. What is immediately clear is that the thruster vector is steered to span an angle larger than 90 degrees in inertial space, as depicted between locations 60 and 61. This net rotation is provided by steering the satellite 11 to which the thruster is mounted. Therefore, even though instantaneously only two axes momentum can be dumped, the net rotation of the thrust vector in inertial space implies that within half a revolution of the orbit, the manageable axes rotate by 90 degrees spanning the previously unmanageable portion of the 3D space. In the end, the net outcome is that, the momentum wheels instantaneously accumulate momentum in unmanageable axis, until the satellite 11 is steered to an orientation (some half a revolution later) where that momentum can be dumped. Thus given adequately sized momentum wheels capable of storing about half a revolution worth of unmanageable momentum and a thruster profile that spans over 90 degrees in inertial space, no chemical thrusters are required for momentum management for single SPT EOR.

At this point it is important to stress that the examples disclosed herein pertain to a sub-synchronous transfer orbit for GEO stationary satellites 11. The mission profile can substantially differ depending on needs. For example, the satellite 11 may not be reoriented to point toward the Earth at the perigee for super-synchronous transfer orbits, because the perigee is deemed to be an important point where active thrusting maybe needed for orbital control. In such cases, the points in the orbit where nominal phases A through F occur may be shifted around, by adjusting their respective true anomalies. It is also prudent to mention that phases A through F may be separated to span many revolutions, in which case the true-anomaly may span between 0 degrees and 360n degrees, where n is the period (in number of orbital revolutions) at which the EOR state machine repeats itself.

Finally, it is important to mention some aspects of power implications. When EOR is performed with SPTs on separate DAPMs, and there is no out of plane steering with the orbital plane close to the equatorial plane of the Earth as depicted in FIG. 3a, power is generally very good. In this case the solar arrays are steered to track the sun. However, if there was large inclination, it may be necessary to steer the satellite about the thrust vector so as to place a more favorable angle between the solar arrays and the sun.

Figure 7:
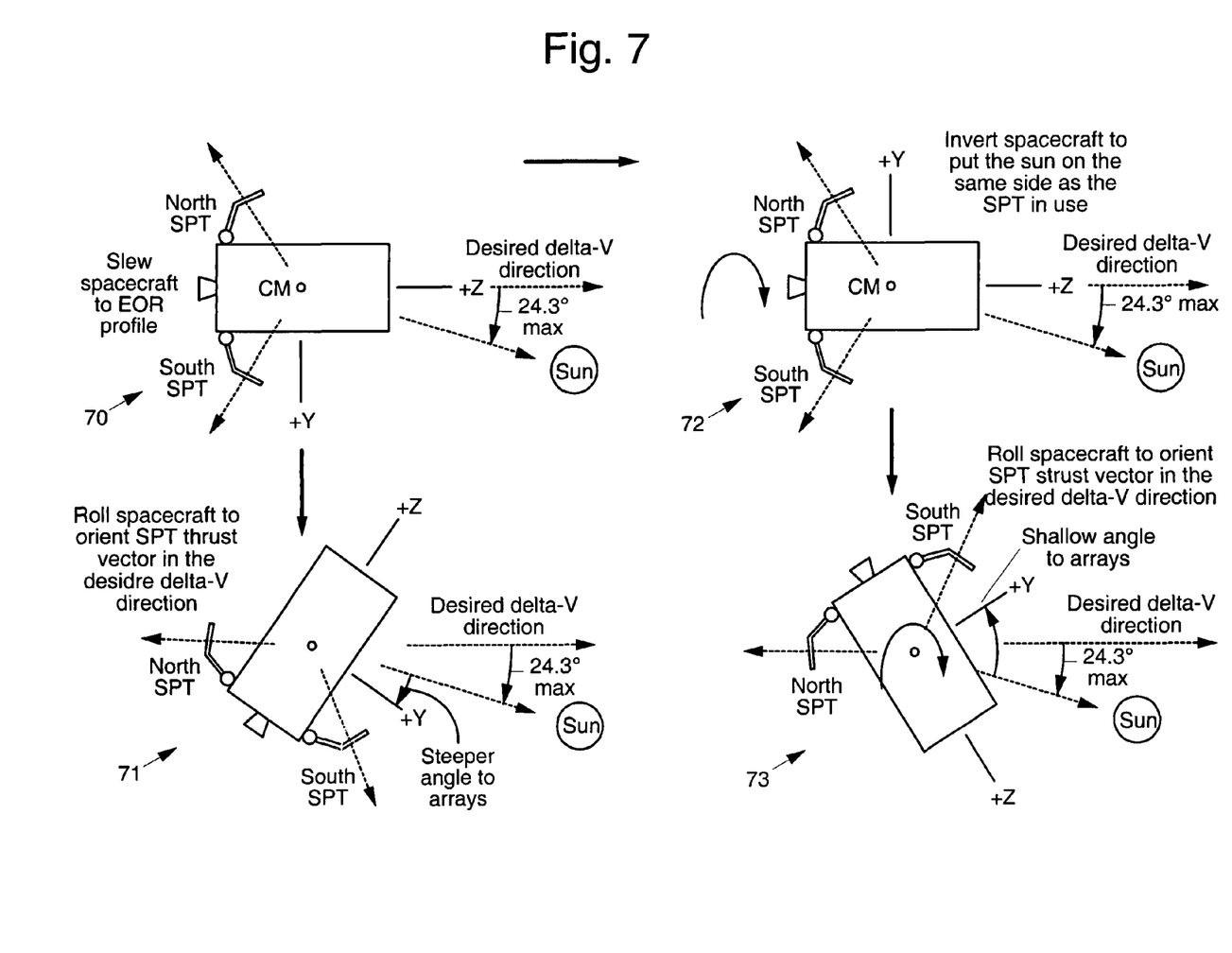
FIG. 7 illustrates an exemplary orientation of the Sun with respect to the satellite during single SPT electric orbit raising.

Power considerations for EOR with a SPT(s) on a single DAPM are a bit more complicated. Given a satellite 11 in the first orientation 70, shown in FIG. 7, the inkling maybe to simply roll the satellite 11 to align the thruster vector aimed through the center of mass to line up with the desired delta-V direction (orientation 71). However given the sun declination (as it would be near winter solstice), this puts a very unfavorable angle between solar arrays and the sun. In this scenario it may be prudent to first invert the satellite 11 (orientation 72, and then roll it in the opposite direction to align the thruster vector with the delta-V direction (orientation 73). This puts a much more favorable angle between the solar arrays and the sun. This sequence would be in the opposite order if a south DAPM SPT was used during summer solstice. Finally, power could further be enhanced by actively steering the satellite 11 about the thrust vector in order to put an even more favorable angle between the solar arrays and the sun.

Thus, apparatus and methods for raising the orbit of a satellite using electric propulsion have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A satellite comprising:
one or more electric propulsion thrusters and an attitude sensor, the attitude sensor including one or more of an earth sensor, a star tracker, a gyro and an inertial reference sensor; the satellite including:
a positioning system that computes a position of the satellite in a dynamically changing orbit;
a profile generator coupled to the positioning system that computes an ideal electric orbit raising profile of the satellite, to achieve target orbit values of perigee, apogee and inclination;
steering apparatus, coupled to the attitude sensor, that generates error signals that are used to control the attitude of the satellite; wherein
onboard the satellite, the ideal electric orbit raising profile and a true anomaly of the dynamically changing orbit are processed in order to compute a desired electric orbit raising steering profile to steer the satellite, the desired electric orbit raising profile including an electric thruster ignition phase, a burn phase, and a shutdown phase that are autonomously repeated, wherein during the burn phase, perigee, apogee and inclination of the satellite are simultaneously driven towards the target orbit values.

2. The satellite recited in claim 1 wherein the positioning system comprises an orbit propagator.

3. The satellite recited in claim 1 wherein the positioning system comprises a global positing system.

4. The satellite recited in claim 1 wherein the electric propulsion thrusters comprise Hall effect thrusters.

5. The satellite recited in claim 4 wherein the electric propulsion thrusters further comprise a bi-propulsion thruster.

6. The satellite recited in claim 1, wherein the inertial reference sensor comprises a gyro that is reset to remove drift when the satellite is in an Earth pointed orientation.

7. The satellite recited in claim 1, wherein the attitude sensor comprises a star tracker.

8. The satellite recited in claim 1, wherein the thrust profile steers the satellite in and out of the orbital plane.

9. The satellite recited in claim 1, wherein the satellite is steered around the thrust vector.

10. The satellite recited in claim 1, wherein two dual axes thruster positioning mechanisms are actuated to dump momentum in three axes simultaneously.

11. The satellite recited in claim 1, wherein a single dual axes thruster positioning mechanism is actuated to dump two axes of momentum, and the satellite itself is steered in inertial space, resulting in full three axis momentum dumping.

12. An electric propulsion orbit raising method for use with a satellite having one or more electric propulsion thrusters, and an attitude sensor, the attitude sensor including one or more of an earth sensor, a star tracker, a gyro, and an inertial reference sensor, the method comprising:
dynamically computing, on board the satellite, an orbital position of the satellite in a dynamically changing orbit;
dynamically computing, onboard the satellite, an ideal electric orbit raising profile of the satellite based on the orbital position, to achieve target orbit values of perigee, apogee and inclination;
dynamically processing, the ideal electric orbit raising profile and a true anomaly of the dynamically changing orbit, and computing, a desired electric orbit raising steering profile to steer the satellite, the desired orbit raising profile including an electric thruster ignition phase, a burn phase, and a shutdown phase, that are autonomously repeated, wherein during the burn phase, perigee, apogee and inclination of the satellite are simultaneously driven towards the target orbit values.

13. The method recited in claim 12 wherein the satellite is steered using a gyro.

14. The method recited in claim 12 wherein the satellite is steered using a star tracker.

15. The method recited in claim 13 wherein the electric propulsion thrusters comprise Hall effect thrusters.

16. The method recited in claim 14 wherein the electric propulsion thrusters further comprise a bi-propulsion thruster.

17. The method recited in claim 13, wherein the inertial reference sensor comprises a gyro that is reset to remove any drift when the satellite is in an Earth pointed orientation.

18. The method recited in claim 12, wherein the attitude sensor comprises a star tracker.

19. The method recited in claim 12, wherein the thrust profile steers the satellite in and out of the orbital plane.

20. The method recited in claim 12, wherein the satellite is steered around the thrust vector.

21. The method recited in claim 12, wherein two dual axes thruster positioning mechanisms are actuated to dump momentum in three axes simultaneously.

22. The method recited in claim 12, wherein a single dual axes thruster positioning mechanism is actuated to dump 2 axes of momentum, and the satellite is steered in inertial space, resulting in 3 axes momentum dumping.

23. An electric propulsion orbit raising method for use with a satellite having a positioning system for generating orbital data relating to the satellite, the positioning system including one or more electric propulsion thrusters, and an attitude sensor, the attitude sensor including one or more of an earth sensor, a star tracker, a gyro and an inertial reference sensor, the method comprising:
computing an orbital position of the satellite in a dynamically changing orbit;
computing, based on the orbital position, an ideal electric orbit raising (EOR) profile, to achieve target orbit values of perigee, apogee and inclination;
processing the ideal electric orbit raising profile and a true anomaly of the dynamically changing orbit, and computing a desired electric orbit raising steering profile to steer the satellite, the desired orbit raising profile including an electric thruster ignition phase, a burn phase, and a shutdown phase that are autonomously repeated, wherein, during the burn phase, perigee, apogee and inclination of the satellite are simultaneously driven towards the target orbit values.

24. The method recited in claim 23 wherein the electric propulsion thrusters are fired after the satellite is slewed from an Earth-pointed attitude to an ideal electric orbit raising attitude, and are shut down prior to the satellite being placed in the Earth-pointed attitude.

* * * * *